(12) United States Patent
Heer

(10) Patent No.: US 7,331,592 B2
(45) Date of Patent: *Feb. 19, 2008

(54) COMPRESSED AIR PROCESSING APPARATUS FOR COMPRESSED AIR SYSTEMS OF MOTOR VEHICLES

(75) Inventor: Siegfried Heer, Wiesloch (DE)

(73) Assignee: Haldex Brake Products GmbH (DE)

( * ) Notice: Subject to any disclaimer, the term of this patent is extended or adjusted under 35 U.S.C. 154(b) by 160 days.

This patent is subject to a terminal disclaimer.

(21) Appl. No.: 10/899,480

(22) Filed: Jul. 26, 2004

(65) Prior Publication Data

US 2005/0017474 A1 Jan. 27, 2005

(30) Foreign Application Priority Data

Jul. 24, 2003 (DE) ............................... 103 33 610

(51) Int. Cl.
*B60G 17/052* (2006.01)
*B60G 11/26* (2006.01)
*B60G 11/27* (2006.01)

(52) U.S. Cl. ............................ 280/124.16; 280/124.157

(58) Field of Classification Search ......... 280/124.157, 280/124.158, 124.159, 124.16, 124.161, 280/5.5

See application file for complete search history.

(56) References Cited

U.S. PATENT DOCUMENTS

| 4,327,936 A | * | 5/1982 | Sekiguchi ................ 280/6.157 |
| 5,678,900 A | * | 10/1997 | Blanz ........................ 303/6.01 |
| 6,089,831 A | * | 7/2000 | Bruehmann et al. ........ 417/282 |
| 6,332,623 B1 | * | 12/2001 | Behmenburg et al. . 280/124.16 |
| 6,540,308 B1 | * | 4/2003 | Hilberer .................... 303/6.01 |
| 6,623,016 B2 | * | 9/2003 | Sulzyc et al. ............ 280/5.514 |
| 2004/0188970 A1 | * | 9/2004 | Matern et al. ......... 280/124.16 |
| 2004/0199312 A1 | * | 10/2004 | Heer .......................... 701/36 |

FOREIGN PATENT DOCUMENTS

| DE | 195 44 621 C1 | 1/1997 |
| DE | 195 38 339 | 4/1997 |
| DE | 196 38 226 C1 | 12/1998 |
| DE | 198 45 925 | 1/2000 |
| DE | 100 38 266 A1 | 2/2002 |
| DE | 101 43 888 | 3/2003 |
| DE | 102 45 815 A1 | 4/2004 |
| EP | 0 372 218 A2 | 6/1990 |
| EP | 0 831 383 B1 | 11/1999 |
| EP | 0 957 018 A2 | 11/1999 |
| EP | 0 776 807 B1 | 5/2001 |
| EP | 1 122 140 A1 | 8/2001 |
| EP | 1 464 556 A1 | 10/2004 |

OTHER PUBLICATIONS

European Search Report, Nov. 9, 2004.

* cited by examiner

*Primary Examiner*—Paul N. Dickson
*Assistant Examiner*—Joselynn Y. Sliteris
(74) *Attorney, Agent, or Firm*—St. Onge Steward Johnston & Reens LLC

(57) ABSTRACT

A compressed air processing apparatus includes a pressure controller, an air dryer, a multi-circuit protection valve and an electronic control unit. A switching valve is designed and arranged to supply compressed air to an air suspension system and to deaerate the air suspension system. The electronic control unit is designed and arranged to control the pressure controller, the air dryer and the multi-circuit protection valve. The electronic control unit is designed and arranged to also control the switching valve of the air suspension system.

25 Claims, 7 Drawing Sheets

COMPRESSED AIR PROCESSING APPARATUS FOR COMPRESSED AIR SYSTEMS OF MOTOR VEHICLES

CROSS REFERENCE TO RELATED APPLICATIONS

This application claims priority to co-pending German Patent Application No. 103 33 610.9 entitled "Druckluftaufbereitungseinrichtung für Kraftfahrzeug-Druckluftanlagen", filed Jul. 24, 2003.

FIELD OF THE INVENTION

The present invention generally relates to a compressed air compressing apparatus for compressed air systems of motor vehicles, especially trucks. Usually, such compressed air processing apparatuses include a pressure controller, an air dryer and a multi-circuit protection valve including a plurality of overflow valves. The compressed air processing apparatus also includes an electronic control unit for controlling the valves of the pressure controller, the air dryer and the multi-circuit protection valve.

BACKGROUND OF THE INVENTION

A compressed air processing apparatus is known from German Patent No. DE 195 44 621 C1 corresponding to European Patent No. EP 0 776 807 B1. The apparatus includes a common structural unit in which the pressure controller, the air dryer and a multi-circuit protection valve are combined. The multi-circuit protection valve includes a plurality of overflow valves having limited backflow, each of the overflow valves being associated with one of the circuits of the apparatus. Conduits lead from the overflow valves to containers of which each one is associated with one of the circuits. Usually, the containers of circuits I and II are associated with the two circuits of the operational brake system of the motor vehicle. Additional circuits serve to supply the parking brake valve as well as secondary aggregates. In this way, there may be a fifth circuit including an overflow valve of the multi-circuit protection valve and leading to a reservoir container via a conduit. Air suspension of the motor vehicle is connected to the reservoir container. In this way, the air suspension system of the motor vehicle is supplied with compressed air, and it is protected.

Another compressed air processing apparatus is known from German Patent No. DE 196 38 226 C1 corresponding to European Patent No. EP 0 831 383 B1. The known apparatus includes a fifth circuit including a reservoir container being protected by an overflow valve.

A method for filling an air suspension system by an air dryer is known from German Patent Application No. DE 100 38 266 A1. A compressor and an air dryer located downstream of the compressor exclusively serve to supply and control the air suspension system. A check valve is bypassed by a throttle. Downstream of the check valve, supply conduits lead to controllable directional valves being located upstream of the respective air suspension bellow. Furthermore, there is an escape valve which is a component of a pressure controller. The pressure controller may also be operated for regeneration of the air dryer. An electronic control unit is associated with the air suspension system. The electronic control unit exclusively controls the elements of the air suspension system and of the associated compressed air processing apparatus.

It is generally known in the field of motor vehicles, especially trucks, to supply the motor vehicle with a pneumatic brake system and a pneumatic air suspension system. The air suspension system is supplied with compressed air by one circuit of the compressed air processing apparatus. This circuit is arranged in addition to the brake circuits. Usually, the air suspension system connected in this way includes a plurality of valves which are at least partly designed as electrically controllable solenoid valves. A special electronic control unit serves to control these solenoid valves of the air suspension system. This separate electronic control unit is arranged at a different place than the electronic control unit of the compressed air processing apparatus. For example, it is arranged in the driver's cabin. In such a case, respective electric lines lead to the solenoid valves of the air suspension system. The structural and assembly expenditure required for these two electronic control units is substantial. The number of connections, electric lines and pneumatic conduits required in the motor vehicle is comparatively great.

A pneumatic air suspension system is known from European Patent Application No. EP 0 372 218 A2. The pneumatic air suspension system is arranged downstream of a source of compressed air including a compressed air processing apparatus. The pneumatic air suspension system is supplied with compressed air by a supply circuit branching off from the compressed air processing apparatus. Three valves are located in a control block, the valves being controlled by a separate electronic control unit. The valves are designed as directly controllable solenoid valves, but they may also be designed as electromagnetic pre-controlled valves which are pneumatically actuated. A first valve has two switching positions, and it is forced into a deaerating position by the force of a spring. The other position which is realized by electronic control is the position in which the deaerating opening is locked in and in which there is connection such that there is compressed air at the exit of this valve, the compressed air coming from the circuit supplying the air suspension system with compressed air. The compressed air is fed to two valves which are also designed as directly actuatable electromagnetic valves. The valves are designed as locking valves, and they are associated with the left side and the right side of the motor vehicle and with the air suspension bellows being located at the left side and the right side, respectively. Path sensors are arranged close to the air suspension bellows. The signals of the path sensors are transmitted to the common control unit. Pressure sensors are arranged in the conduits leading to the air suspension bellows. The signals of the pressure sensors are also transmitted to the common electronic control unit. Such a known air suspension system requires the use of a separate electronic control unit and of respective connections to a compressed air processing apparatus. The structural expenditure and the assembly expenditure are substantial.

SUMMARY OF THE INVENTION

The present invention relates to a compressed air processing apparatus. The apparatus includes a pressure controller, an air dryer, a multi-circuit protection valve and an electronic control unit. A switching valve is designed and arranged to supply compressed air to an air suspension system and to deaerate the air suspension system. The electronic control unit is designed and arranged to control the pressure controller, the air dryer and the multi-circuit protection valve. The electronic control unit is designed and arranged to also control the switching valve of the air suspension system.

With the novel compressed air processing apparatus, the structural expenditure in a motor vehicle required for the processing of compressed air, on the one hand, and for the air suspension system, on the other hand, is substantially reduced. In the novel compressed air processing apparatus, the electronic control unit of the compressed air processing apparatus is also designed and arranged to control valves of an air suspension system.

The novel compressed air processing apparatus does not include two separate electronic control units. Instead, it includes one common electronic control unit which fulfills the functions required to process compressed air as well as the functions required to supply and control the air suspension system. Consequently, the structural expenditure of the apparatus is reduced, and the number of electric and pneumatic connections is also reduced. Consequently, the space requirement for the arrangement of the (common) electronic control unit is substantially reduced. Although the two electronic control units known from the prior art are now combined to form one common electronic control unit, the pneumatic elements for processing compressed air, on the one hand, and for air suspension, on the other hand, may be located at different places or at one common place as it is advantageous for the respective case of application. Different levels of integration are possible. The electric elements of the electronic control unit and the pneumatic elements, especially the valves, of the compressed air processing apparatus, on the one hand, and of the air suspension system, on the other hand, may also be integrated into one structural unit.

At least a switching valve supplying compressed air for the air suspension system and serving for deaeration, respectively, is integrated into the compressed air processing apparatus. This valve is either designed as a pneumatically controllable valve which is pre-controlled by a solenoid valve or as a directly electrically controllable solenoid valve. The switching valve has two positions. The first position is a deaerating position which is biased by a mechanical spring. The other position is a passage position for compressed air of circuit V to two locking valves located downstream. The locking valves serve to aerate, deaerate and lock aerated bellows. It is also possible to integrate additional elements and components of the air suspension system. For example, these elements and components may be integrated into a common housing of the compressed air processing apparatus together with the elements and components of the pressure controller, the air dryer and the multi-circuit protection valve as well as the electronic control unit. In this way, it is possible to combine the valves of the pressure controller, the valves of the air dryer, the valves of the multi-circuit protection valve, the switching valve and locking valves for conduits of the air suspension system leading to air suspension bellows in one common structural unit. The structural unit may be designed as one piece. However, it is also possible to design the structural unit to include a plurality of modules.

The switching valve may be designed as a pneumatically switchable valve. In this case, a solenoid valve is associated with the switching valve as its pre-control valve. The solenoid valve is designed to be electrically controllable. The solenoid valve used as the pre-control valve may also be used to control an additional pneumatically switchable valve of the compressed air processing apparatus, especially an overflow valve of the multi-circuit protection valve. Such a design is especially advantageous since the number of solenoid valves serving as pre-control valves is reduced and one or more solenoid valves may be used for a plurality of functions without problem.

However, it is also possible to design the switching valve as electrically directly controllable valve. In this case, the switching valve is used to control another pneumatically switchable valve of the compressed air processing apparatus, especially an overflow valve of the multi-circuit protection valve. Again, the number of required pre-control valves is reduced.

There also is the possibility of integrating a valve for arbitrarily lifting, keeping constant and lowering the entire body of the vehicle with respect to the axles into the housing of the compressed air processing apparatus or into a module. Such a valve is especially advantageous when adapting the height of the body of the truck to a loading platform. The possibilities and functions required for this purpose may be also fulfilled by a plurality of valves being respectively controlled by the common electronic control unit.

Furthermore, there is the possibility of integrating a valve for lifting and lowering a lifting axle into the common structural unit in which the elements of the compressed air processing apparatus are arranged. It then makes sense to also integrate into the structural unit two branching valves to supply the air suspension bellows of the lifting axle. The branching valves serve to supply the air suspension bellows of the lifting axle with compressed air. In the first position, meaning when the lifting axle is lifted, the air suspension bellows of the lifting axle are deaerated, while the air suspension bellows are all supplied with the same pressure as the driving axle in the second position.

In case the motor vehicle, especially a truck, is supplied with a lifting axle, it is preferred to also integrate a lifting axle valve in the common structural unit also carrying the elements of the compressed air processing apparatus. The lifting axle valve is designed and arranged to lift and lower the lifting axle. The lifting axle valve is supplied with compressed air of circuit V, and it aerates and deaerates, respectively, a lifting cylinder which supports the lifting axle. The lifting axle valve then also fulfills the function of the valve for lifting and lowering the lifting axle and of the branching off valves for aerating and deaerating the air suspension bellows of the lifting axle.

A locking valve may be located in the common structural unit also including the elements of the compressed air processing apparatus. The locking valve provides a transverse throttle for the air suspension bellows of the right side of the motor vehicle with respect to the air suspension bellows of the left side of the motor vehicle. The locking valve including the transverse throttling function may either be associated with the front axle or the rear axle of the motor vehicle. The transverse throttle throttles the possible air exchange between air suspension bellows of opposing sides of the motor vehicle.

Pressure sensors may be integrated into the common structural unit. The pressure sensors sense and determine the respective pressures in the air suspension bellows, and they transmit respective signals to the common electronic control unit. The number of pressure sensors may be less than the number of supply conduits of the air suspension bellows.

The novel compressed air processing apparatus allows for a modular structure. One may realize separate modules which may be combined to a common apparatus depending on the requirements. When connecting the separate modules, the required pneumatic connections as well as the required electric connections are realized. The modules may be separately replaced. Usually, there is a first module including the air dryer, the pressure controller and a regeneration valve. A second module includes the elements of the multi-circuit protection valve as well as possibly pressure sensors to sense and determine the pressures of circuits I to IV. The electronic control unit and electrically controllable pre-control valves as well as possibly pressure sensors are located in a third module. The pneumatically controllable valves of the air suspension system are located in a fourth module. The electrically controllable pre-control valves are arranged in a fifth module.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF EMBODIMENTS

Figure 1:
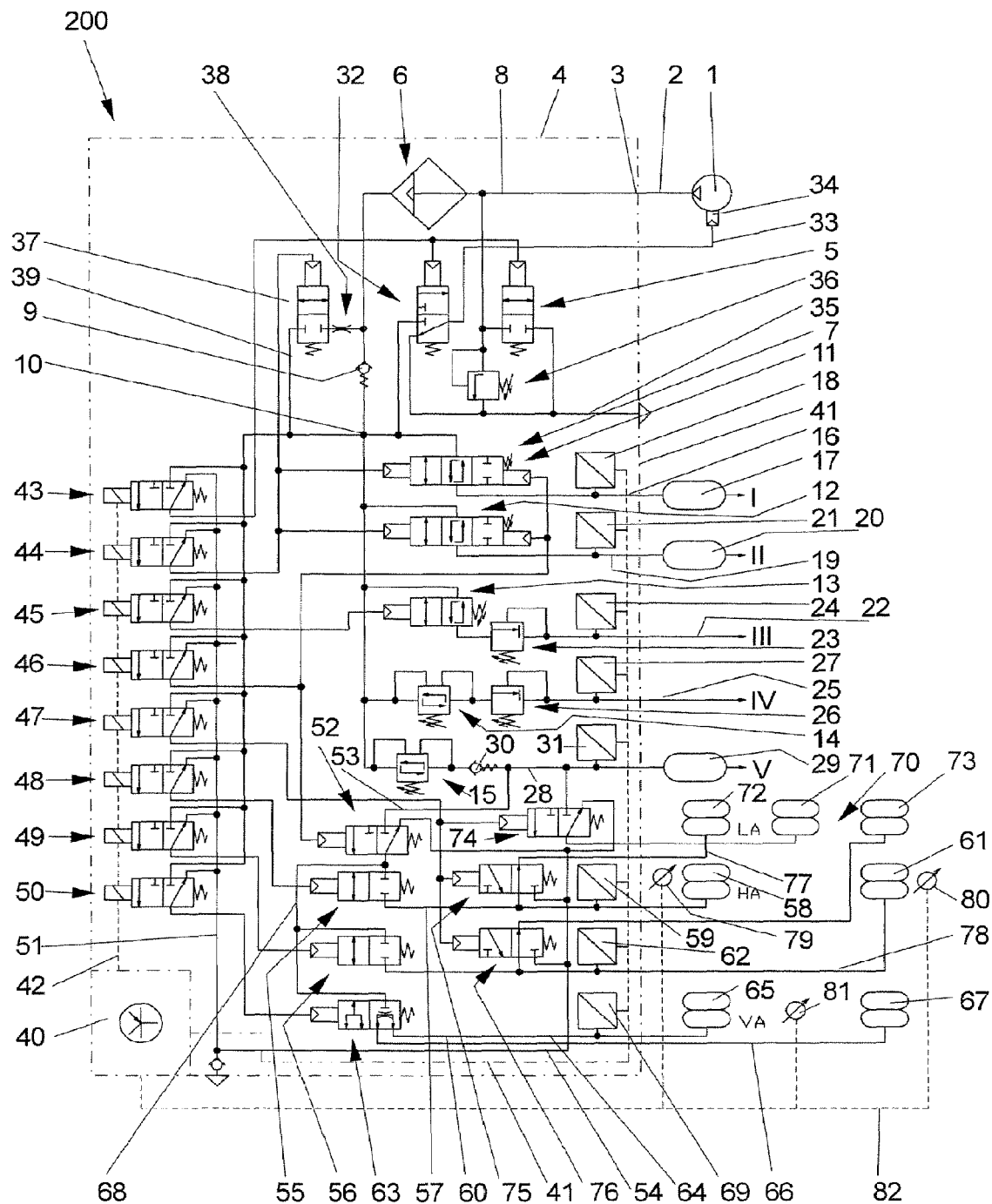
FIG. 1 is a schematic view of a first exemplary embodiment of the novel compressed air processing apparatus including an integrated air suspension system of the motor vehicle.

Referring now in greater detail to the drawings, FIG. 1 and all following figures illustrate the pneumatic elements, parts, components and conduits by a continuous line, while electric lines are illustrated by a broken line.

The compressed air processing apparatus 200 includes a compressor 1 from which a pneumatic conduit 2 leads to a connection 3 being located at a structural unit 4. The structural unit 4 may especially be designed as a common housing. A pressure controller 5, an air dryer 6 and a multi-circuit protection valve 7 are located in the structural unit 4, and they are schematically illustrated in FIG. 1. These elements are designed and interconnected in a way which is well-known in the art and such that they fulfill the known function of processing compressed air.

A conduit 8 leads from the connection 3 to the air dryer 6 and to a check valve 9 at which the central aerating system 10 begins. The central aerating system 10 is to be understood as a chamber which is not subjected to the idle cycle of the compressor. Compressed air is supplied to an overflow valve 11 having limited backflow by the central aerating system 10 and respective conduits. The overflow valve 11 is associated with circuit I. Additionally, an overflow valve 12 being associated with the circuit II is supplied with compressed air. The same applies to an overflow valve 13 of circuit III, an overflow valve 14 of circuit IV and an overflow valve 15 of circuit V. A conduit 16 leads from the overflow valve 11 to a reservoir container 17 of circuit I. A pressure sensor 18 is connected to the conduit 16. A conduit 19 leads from the overflow valve 12 to the reservoir container 20 of circuit II. A pressure sensor 21 is located in the conduit 19, the pressure sensor 21 observing the pressure in the reservoir container 20. The two overflow valves 11 and 12 are part of the multi-circuit protection valve 7. The circuits I and II are usually associated with the supply of the operational brake. The overflow valves 11 and 12 include (as illustrated) a pneumatic control portion with which the overflow valves 11 and 12 may be switched into the opened position even below the opening pressure to be filled in a preferred way. At the other side, the overflow valves 11 and 12 also have a pneumatic control portion which includes a fourth effective surface which leads to a locking position of the overflow valves 11 and 12. The locking positions of the overflow valves 11 and 12 may be active, for example, when it is desired to fill circuit V in a preferred way, especially with a comparatively increased reservoir pressure, for example.

A conduit 22 is connected to the overflow valve 13 of circuit III. A pressure limiting device 23 and a pressure sensor 24 are located in the conduit 22. The overflow valve 13 is also designed to be biased by a spring, as usual. The overflow valve 13 is designed to be pneumatically controlled, and in this way it reaches an opened position independent of the opening pressure of the overflow valve 13.

Circuit IV also includes a conduit 25 branching off from the overflow valve 14. A pressure limiting device 26 and a pressure sensor 27 are arranged in the conduit 25. The overflow valve 14 is designed as an overflow valve having limited backflow in a usual manner, and it does neither include a third nor a fourth effective surface. Circuit III may serve for supply of the trailer of the motor vehicle, while circuit IV is associated with secondary consumers.

A conduit 28 leads from the overflow valve 15 of circuit V to the reservoir container 29. A check valve 30 and a pressure sensor 31 are located in the conduit 28. All overflow valves 11, 12, 13, 14, 15 as well as the pressure limiting devices 23 and 26 and the check valve 30 are components of the multi-circuit protection valve 7.

The apparatus 200 further includes a compressor control valve 32 being designed to be pneumatically controllable and to have the two illustrated positions. The compressor control valve 32 is also supplied with compressed air coming from the central aerating system 10. A conduit 33 leads from the compressor control valve 32 to a switching element 34 at the compressor 1. At the other side, a deaerating conduit 35 leads to a deaerating opening at the housing and at the structural unit 4, respectively.

A safety valve 36 at its entrance side is supplied with pressure being delivered by the compressor 1 through the conduit 8. At its exit side, it is also connected to the deaerating conduit 35. A connecting conduit leads from the pressure controller 5 to the deaerating conduit 35 and into the atmosphere.

Furthermore, a regeneration valve 37 is provided, the regeneration valve 37 being designed to the pneumatically controllable and to include the two illustrated positions. A throttle 38 being located in a bypass conduit 39 is located downstream of the regeneration valve 37. The bypass conduit 39 bypasses the check valve 9 to realize regeneration of the air dryer 6.

An electronic control unit 40 serves as the central control unit for all parts and elements of the air processing system and the air suspension system. Electric lines 41 are illustrated by broken lines. The signals of the pressure sensors 18, 21, 24, 27 and 31 are fed to the control unit 40 by the electric lines 41.

The electronic control unit 40 processes the signals, and it controls a plurality of solenoid valves via electric control lines 42 depending on the desired operational mode. The electronic control unit 40 is designed to be programmable for this purpose.

The solenoid valves are designed as pre-control valves. They are designed to be electrically controlled by the electronic control unit 40, and they convert the respective electric signal into a pneumatic signal which is fed to respectively pneumatically controllable valves. A first solenoid valve 43 as well as all other solenoid valves is supplied with compressed air coming from the central aerating system 10. A pneumatic conduit is connected at the exit, the pneumatic conduit leading to the pressure controller 5 and the compressor control valve 32 such that the solenoid valve 43 serves as pre-control valve for these two valves. A second solenoid valve 44 serves to open the overflow valves 11 and 12 and to initiate regeneration. For this purpose, a pneumatic control unit at the side of the exit leads to the overflow valves 11 and 12, at one side, and to the regeneration valve 37, at the other side. A third solenoid valve 45 serves to open the overflow valve 13 of circuit III. A fourth solenoid valve 46 serves to close the overflow valves 11 and 12 of circuits I and II as well as to aerate a switching valve of the air suspension system which will be described herein below. A fifth solenoid valve 47 serves for a lifting axle. A sixth solenoid valve 48 serves as pre-control unit for locking valves of the left side of the motor vehicle, for example, which will be described herein below. A seventh solenoid valve 49 is designed as a pre-control valve for respective locking valves of the right side of the motor vehicle, and a solenoid valve 50 serves to pre-control a locking valve of the front axle of the motor vehicle. All solenoid valves 43 to 50 have the same design, and they include the two illustrated positions. In the first position, the solenoid valves at their exits are connected to the atmosphere via a deaerating conduit 51. This position is the position of the solenoid valves which they take in the absence of current. While the solenoid valves 43 to 46 are substantially associated with the elements of the compressed air processing system, the solenoid valves 47 to 50 are pre-control valves for the elements of the air suspension system.

A switching valve 52 is part of the air suspension system. The switching valve 52 is subjected to compressed air coming from a conduit 53 from the container 29 downstream of the check valve 30. The conduit 53 is locked in the pressureless position. A deaerating conduit 54 leads to the deaerating conduit 51 and to the atmosphere, respectively. The switching valve 52 is an integral component of the structural unit 4 of the compressed air processing apparatus 200. It serves to supply compressed air of circuit V to locking valves 55 and 56 being located downstream. The locking valves 55 and 56 have a locking position and a passage position. The force of a spring causes the locking position in the pressureless condition. The switching valve 52 may be associated with the left side of the vehicle, and it is pre-controlled by the solenoid valve 48. A conduit 57 leads to the air suspension bellows 58 being associated with the left side of a rear axle of the motor vehicle. The rear axle is designed as a driving axle. A pressure sensor 59 observes the pressure in the air suspension bellows 58, and it sends a respective electric signal to the electronic control unit 40 via the electric line 41. A conduit 78 leads from the locking valve 56 to an air suspension bellow 61 which may be associated with the driven rear axle on the right side of the motor vehicle. A pressure sensor 62 is provided. The locking valve 56 is pre-controlled by the solenoid valve 49.

Furthermore, a locking valve 63 is associated with a front axle. The locking valve 63 has the two illustrated positions. It is pre-controlled by the solenoid valve 50. In its pressureless condition, it connects a conduit 64 leading to an air suspension bellow 65 on the left side of the motor vehicle at the front axle with a conduit 66 leading to air suspension bellows 67 at the right side of the motor vehicle in the region of the front axle. The conduits 64 and 66 are connected via a transverse throttle. In its other position, the locking valve 63 connects the two conduits 64 and 66 with a conduit 68 by which compressed air of circuit V provided by the switching valve 52 is further transmitted. A pressure sensor 69 serves to observe the pressure in the air suspension bellows 65 and 67.

In case the motor vehicle includes a lifting axle, there are a lifting bellow 71, air suspension bellows 72 on the left side of the motor vehicle and air suspension bellows 73 on the right side of the motor vehicle. A valve 74 serving to control the lifting bellow 71 of the lifting axle 70 lifts and lowers, respectively, the lifting axle 70. The valve 74 for lifting and lowering the lifting axle 70 is pre-controlled by the solenoid valve 47. Compressed air coming from the reservoir container 29 of circuit V subjects the valve 74.

Two branching off valves 75 and 76 are associated with the lifting axle 70. The branching off valves 75 and 76 are also pre-controlled by the solenoid valve 47. A conduit 77 leads from the branching off valve 75 to the air suspension bellows 72. A conduit 78 leads from the branching off valve 76 to the air suspension bellow 61. In a first position of the branching off valves 75 and 76, there is connection between the air suspension bellows 58 and 72, on the one hand, and 61 and 73, on the other hand. This is the position in which the lifting axle 70 is lowered and in which the air suspension bellows 58, 61, 72, 73 have the same pressure. In the other position, meaning when the lifting axle 70 is lifted, the deaerating conduit 74 leads to the atmosphere. A path sensor 79 for the air suspension bellows 72 of the lifting axle 70 is located at the left side of the motor vehicle. A path sensor 80 for the air suspension bellow 73 of the lifting axle 70 is located at the right side of the motor vehicle. A path sensor 81 is associated with the front axle. Electric signals are transmitted to the electronic control unit 40 by an electric line 82.

Depending on the programming of the control unit 40, different operational modes are possible. During the load phase of the compressor, compressed air is fed to the central aerating system 10 via the air dryer 6 and the check valve 9. It is possible to realize preferred filling of the containers 17 and 20 of circuits I and II by opening the overflow valves 11 and 12 by the solenoid valve 44. Correct filling of the circuits I to IV is observed by the pressure sensors. The overflow valves 11 and 12 may be switched into the closed position by the solenoid valve 46 when the predetermined pressure has been reached. Usually, the reservoir container 29 of circuit V is then filled with increased pressure, for example pressure in a range of approximately 12 to 15 bar. This reservoir pressure also subjects the locking valves 55 and 56 since the switching valve 52 has been switched into the passage position by the solenoid valve 46. When the path sensors 79, 80 and 81 determine a deviation of the body of the motor vehicle from the normal position, respective signals are transmitted to the control unit 40 and compressed air is sent into the respective air suspension bellows by the locking valves 55, 56 and 63. This is realized by pre-control with the solenoid valves 48, 49 and 50. When the load of the motor vehicle requires it, the lifting axle 70 is lowered by deaeration of the lifting bellow 71, and the air suspension bellows 72 and 73 of the lifting axle 70 are connected to the bellows 58 and 61, respectively, of the rear axle. In this way, the valves and elements of the air suspension system are integrated in the common structural unit 4 of the compressed air processing apparatus 200.

Figure 2:
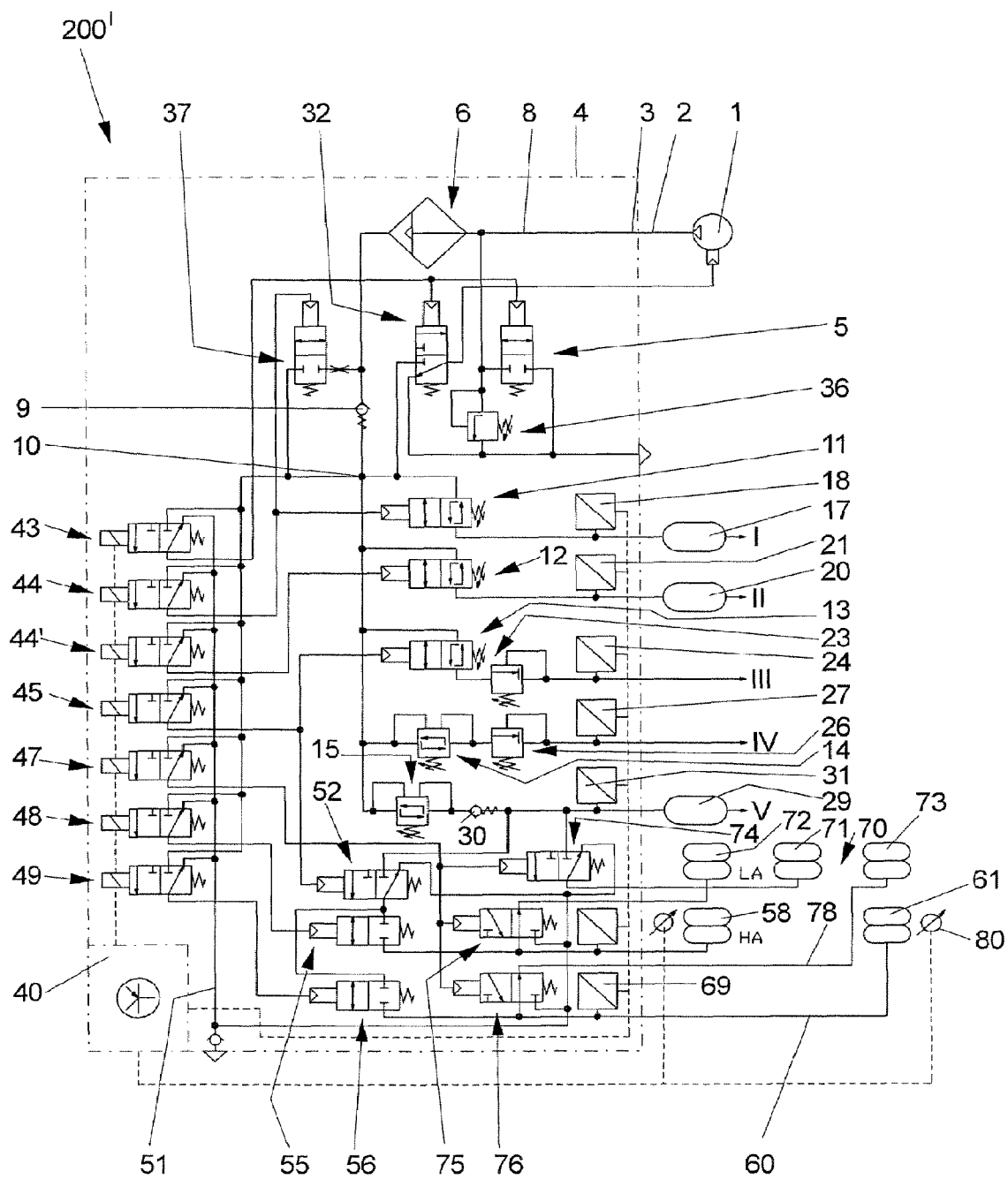
FIG. 2 is a schematic view of a second exemplary embodiment of the novel compressed air processing apparatus.

FIG. 2 illustrates another exemplary embodiment of the novel compressed air processing apparatus 200'. The apparatus 200' has a lot of parts in common with the apparatus 200 illustrated in FIG. 1. Consequently, it is referred to the above description with respect to the structure and function of the apparatus 200. In contrast to the embodiment of the apparatus 200, the apparatus 200' includes a solenoid valve 44 only serving for pre-control of the overflow valve 11 of circuit I. An additional solenoid valve 44' serves for pre-control of the overflow valve 12 of circuit II. The solenoid valve 45 does not only serve as a pre-control valve of the overflow valve 13 of circuit III, but also as pre-control valve of the switching valve 52. The overflow valves 11 and 12 do not include a fourth effective surface, and thus no locking position. There is only one rear axle and a lifting axle 70. In this case, the trailer does not include a front axle. Consequently, there is no locking valve 63. The function of the apparatus 200' may be understood with reference to the above description and the illustration of FIG. 2.

Figure 3:
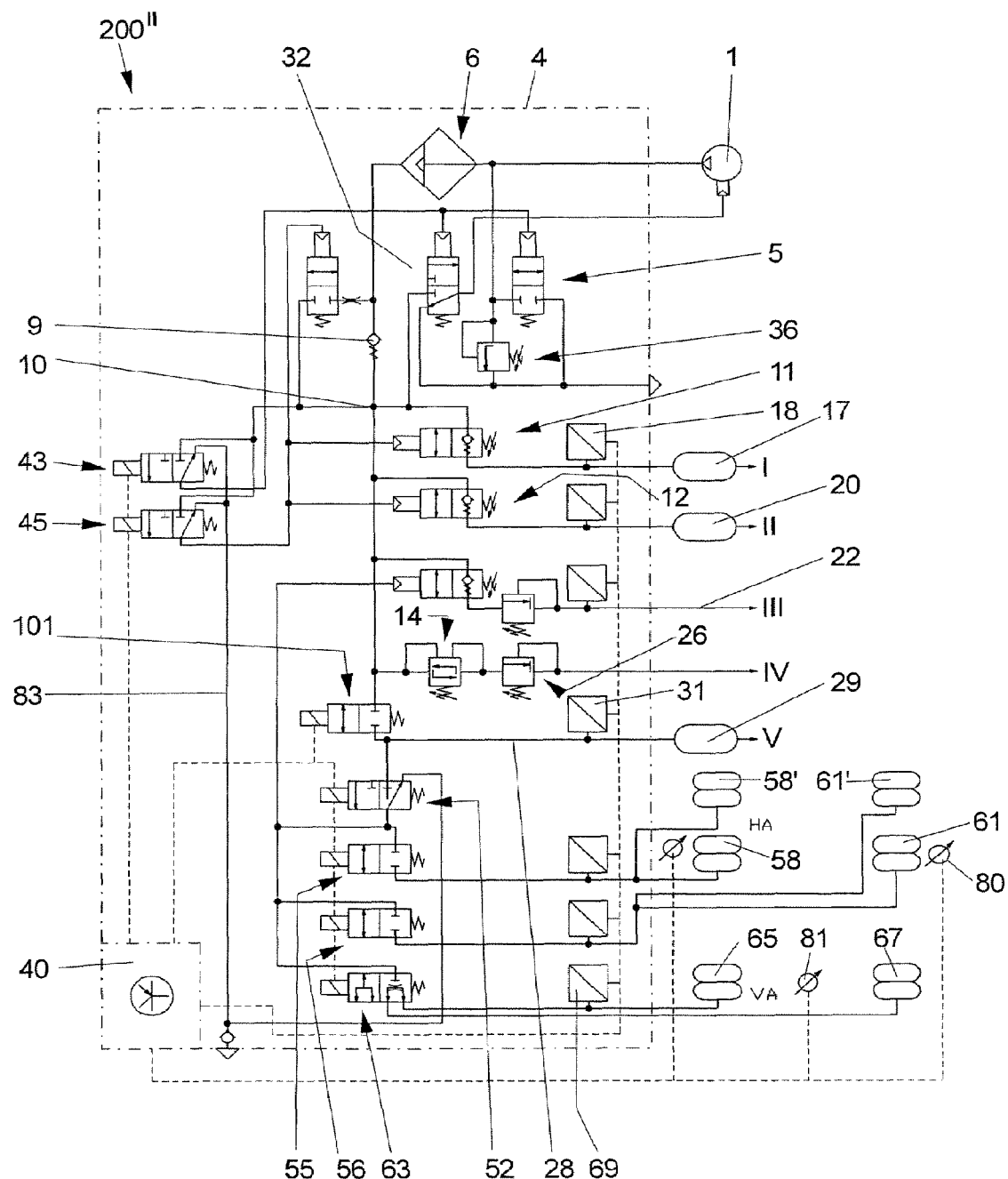
FIG. 3 is a schematic view of a third exemplary embodiment of the novel compressed air processing apparatus.

The system illustrated in FIG. 3 also combines elements and components of the compressed air processing apparatus 200'' and of the air suspension system in one structural unit 4. In this case, only the solenoid valves 43 and 44 are designed as pre-control valves. The overflow valves 11 and 12 do not include a fourth effective surface. The overflow valves 11, 12 and 13 are designed as pilot check valves. Instead of the overflow valve 15, an electrically controllable directly switching locking valve 101 is located in the conduit 28 leading to the reservoir container 29 of circuit V. Compressed air coming from the central aerating system 10 subjects the locking valve 101. The control unit 40 directly controls the locking valve 101, and it switches the locking valve 101 into the closed position after correct filling of the reservoir container 29. In this way, compressed air from the reservoir container 29 also subjects the switching valve 52 which is directly switched by the control unit 40. A pneumatic control conduit 83 branches off from the conduit leading to the locking valves 55 and 56 at the exit side. The overflow valve 13 of circuit III is pre-controlled by the control conduit 83. The switching valve 52 also fulfills the function of a pre-control valve for the overflow valve 13.

Figure 4:
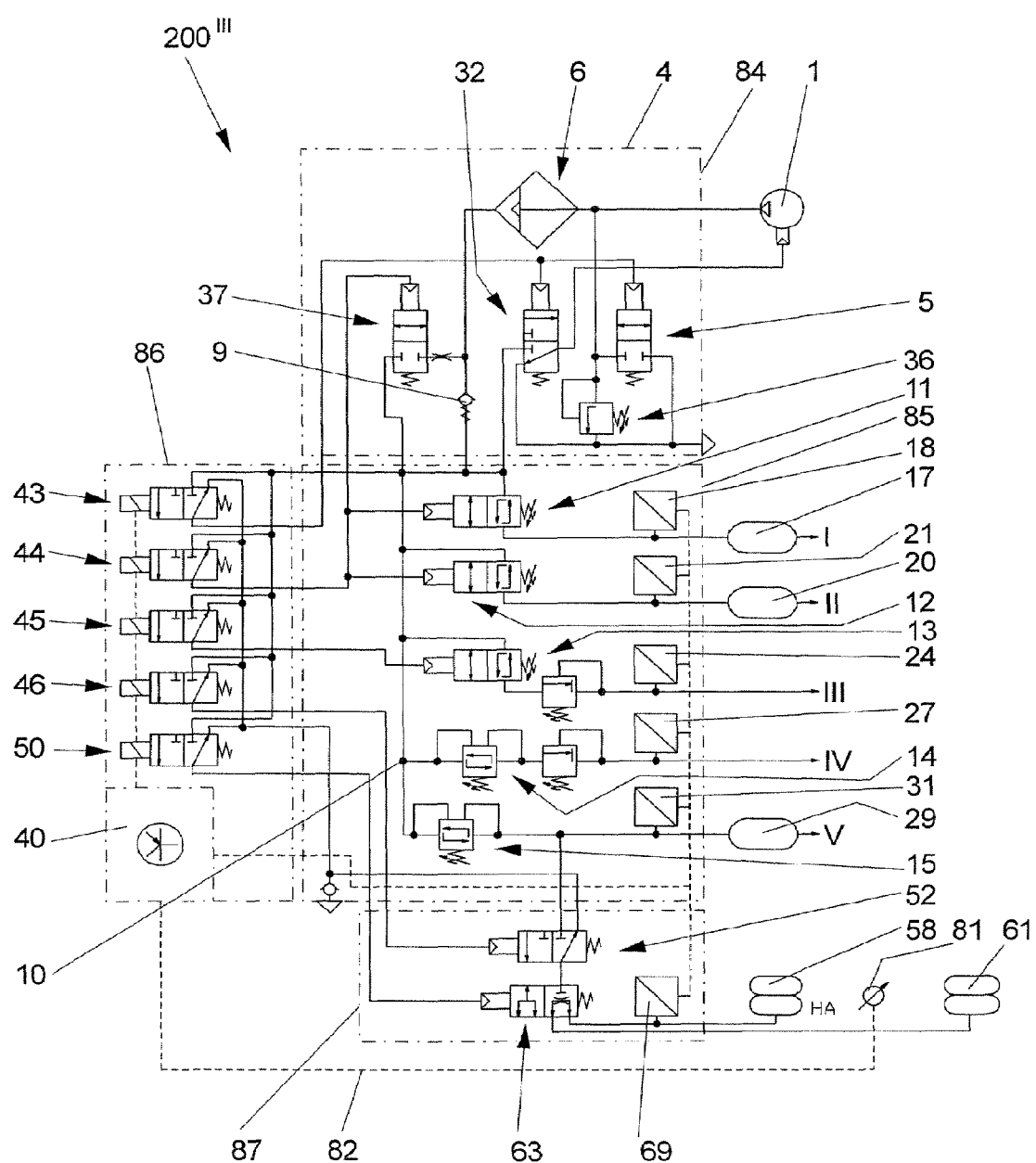
FIG. 4 is a schematic view of a fourth exemplary embodiment of the novel compressed air processing apparatus including a plurality of modules.

FIG. 4 illustrates a modular structure of the structural unit 4. A first module 84 includes the pressure controller 5, the air dryer 6, the compressor control valve 32, the safety: valve 36 and the regeneration valve 37 as well as the check valve 9. A second module 85 being designed and arranged to be connected to the first module 84 contains the overflow valves 11, 12, 13, 14, 15, the pressure sensors 18, 21, 24, 27, 31 and the pressure limiting devices 23 and 26. A third module 86 contains the various solenoid valves as well as the electronic control unit 40. A fourth module 87 contains the switching valve 52 as well as the locking valve 63 and the pressure sensor 69. FIG. 4 only illustrates a rear axle with the air suspension bellows 58 and 61 such that the module 87 has a comparatively simple design. It is easily imaginable that the embodiment of the apparatus 200 to 200'' of FIGS. 1 to 3 may also be designed as modules. The elements are then located in structural units 4 as desired to fulfill the respective requirements. Furthermore, it is imaginable that the respective elements of a module may be located in a different module. For example, the pressure sensors 18, 21, 24, 27 and 31 of module 85 may be associated in the module 86.

Figure 5:
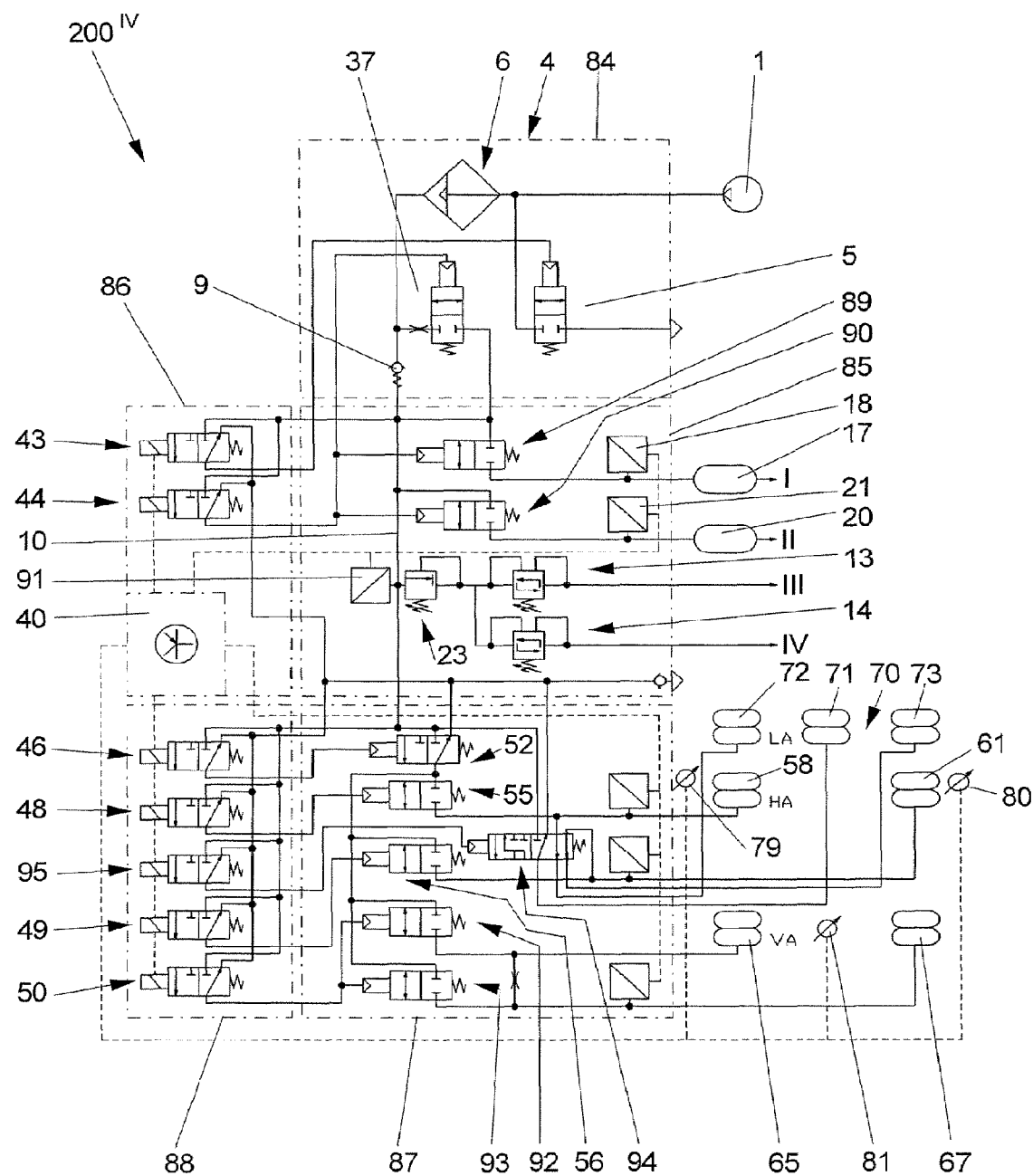
FIG. 5 is a schematic view of a fifth exemplary embodiment of the novel compressed air processing apparatus including a plurality of modules.

FIG. 5 illustrates another possibility of a modular design of the structural unit 4. The first module 84 contains the pressure controller 5, the air dryer 6, the regeneration valve 37 and the check valve 9. Instead of the overflow valves 11 and 12, pneumatically pre-controllable locking valves 89 and 90 as well as the associated pressure sensors 18 and 21 are located in the second module 85. The circuit III includes the overflow valve 13 with a pressure limiting device 23 being located upstream of the overflow valve 13. The pressure limiting device 23 also influences the overflow valve 14 of circuit IV. A pressure sensor 91 observes the pressure in the central aerating system 10. The two solenoid valves 43 and 44 for controlling the pressure controller and the locking valves 89 and 90, respectively, as well as the electronic control unit 40 are located in the third module 86. The fourth module 87 includes the elements of the air suspension system, for example the switching valve 52 and the two locking valves 55 and 56 of the rear axle. Two locking valves 92 and 93 serve to control the air suspension bellows 65 and 67 of the front axle. A lifting axle valve 94 is integrated in the module 87. The valve 94 has the function to lift and lower, respectively, the lifting axle 70 and to supply the lifting bellows 72 and 73 of the lifting axle 70 with compressed air. In this embodiment, there is no protection valve for circuit V and no reservoir container 29.

Various solenoid valves serving as pre-control valves are located in another module 88. The solenoid valve 46 serves to pre-control the switching valve 52. The solenoid valve 48 controls the locking valve 55. The solenoid valve 49 controls the locking valve 56. A solenoid valve 95 serves to pre-control the lifting axle valve 94. The solenoid valve 50 pre-controls the two locking valves 92 and 93 of the front axle. The remaining connections and their function may be understood by a person with skill in the art with reference to FIG. 5.

Figure 6:
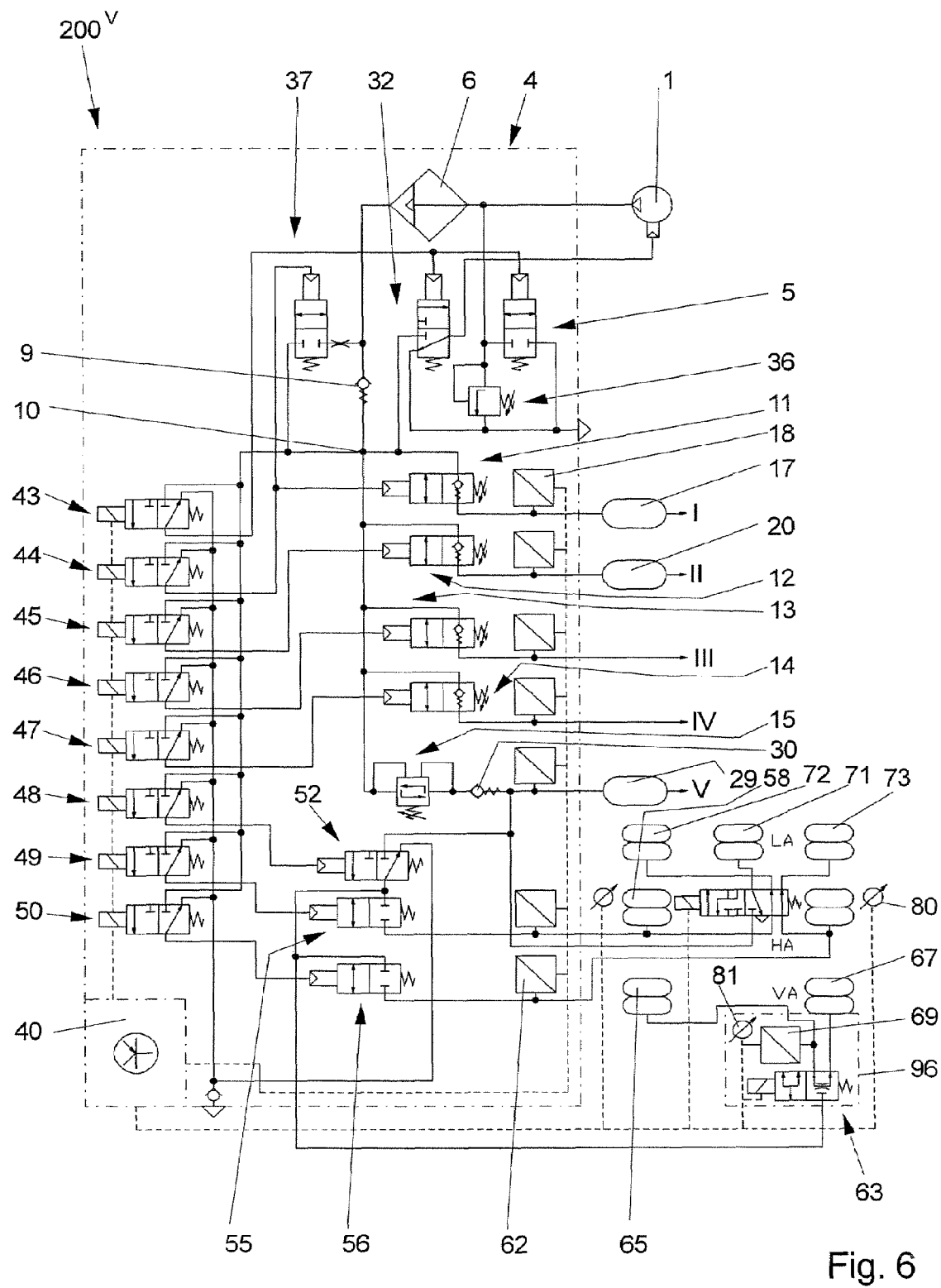
FIG. 6 is a schematic view of a sixth exemplary embodiment of the novel compressed air processing apparatus.

FIG. 6 illustrates another exemplary embodiment of the apparatus $200^V$ in which the elements for processing of compressed air and of the air suspension system are mostly located within a common structural unit 4. The overflow valves 11 and 14 are designed as pilot pre-control check valves. The switching valve 52 and the locking valves 55 and 56 are integrated into the structural unit 4. The same applies to the solenoid valves 43 to 50 serving as pre-control valves. A locking valve 63 is located outside of the structural unit 4. The locking valve 63 is located in a structural unit 96 also holding the path sensor 81 as well as the pressure sensor 69. The structural unit 96 is associated with the front axle. The lifting axle valve 94 is located close to the air suspension bellows 58 and 61 of the rear axle. Control is realized by the electronic control unit 40 and respective electric line connections.

Figure 7:
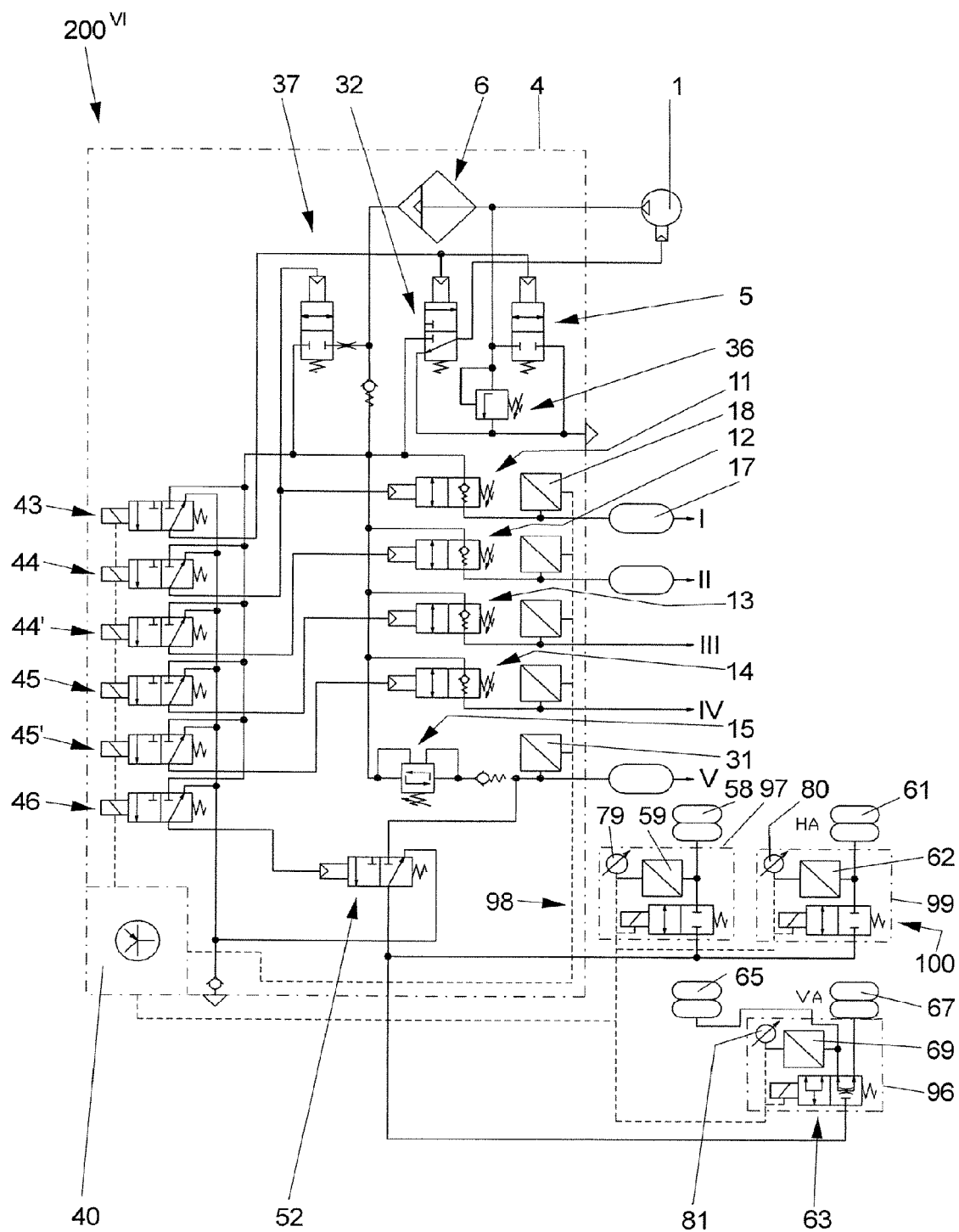
FIG. 7 is a schematic view of a seventh exemplary embodiment of the novel compressed air processing apparatus.

In the exemplary embodiment of the apparatus $200^{VI}$ illustrated in FIG. 7, important elements of the compressed air processing apparatus are located in a structural unit 4. The overflow valves 11 to 14 are designed as pilot pre-controlled checked valves. The circuit V includes a normal overflow valve 15 having limited backflow. The switching valve 52 of the air suspension system is also and integral part of the structural unit 4. The locking valve 63 being associated with the front axle, the pressure sensor 69 and the path sensor 61 are located in a structural unit 96. A structural unit 97 is associated with the air suspension bellow 58 of the left side of the vehicle. The structural unit 97 holds a locking valve 98, the pressure sensor 59 and the path sensor 79. A structural unit 99 contains a locking valve 100, the pressure sensor 62 and their path sensor 80 being associated with the air suspension bellows 61 of the right side of the vehicle and the rear axle. Furthermore, respective solenoid valves 43, 44, 44', 45, 45' and 46 are integrated. The solenoid valve 44' serves for pre-control of the overflow valve 12 of circuit II. The solenoid valve 45' serves for pre-control of the overflow valve 14 of circuit III also being designed as a respective pilot check valve.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A compressed air processing apparatus built as a structural unit, comprising:
   a pressure controller;
   an air dryer;
   a multi-circuit protection valve comprising a plurality of valves designed and arranged for the supply of at least two circuits wherein at least one circuit is associated with the supply of an operational brake; and
   an electronic control unit, said electronic control unit being designed and arranged to control said pressure controller, said air dryer and said multi-circuit protection valve, said electronic control unit being designed and arranged to control a switching valve of an air suspension system, the switching valve being designed and arranged to supply compressed air to the air suspension system and to deaerate the air suspension system, the switching valve being arranged in said compressed air processing apparatus.

2. The compressed air processing apparatus of claim 1, wherein the air suspension system includes a plurality of locking valves, a plurality of air suspension bellows and a plurality of conduits being connected to the air suspension bellows, said compressed air processing apparatus further comprising a structural unit in which said pressure controller, said air dryer, said multi-circuit protection valve, said switching valve and the locking valves are arranged.

3. The compressed air processing apparatus of claim 1, further comprising:
   a solenoid valve, said solenoid valve being designed and arranged as a pre-control valve for the switching valve, the switching valve being designed as a pneumatically switchable valve; and
   an additional valve, said additional valve being designed and arranged to be pneumatically switchable, said solenoid valve being designed and arranged to also control said additional valve.

4. The compressed air processing apparatus of claim 3, wherein said additional valve is designed as an overflow valve of said multi-circuit protection valve.

5. The compressed air processing apparatus of claim 1, further comprising an additional valve, said additional valve being designed to be pneumatically switchable, said switching valve being designed to be electrically directly switchable, said switching valve being designed and arranged to control said additional valve.

6. The compressed air processing apparatus of claim 5, wherein said additional valve is designed as an overflow valve of said multi-circuit protection valve.

7. The compressed air processing apparatus of claim 2, further comprising:
   a valve for lifting and lowering a lifting axle of a motor vehicle, said valve being arranged in said structural unit; and
   two branching off valves, said branching off valves being designed and arranged to supply compressed air to air suspension bellows of the lifting axle of the motor vehicle, said branching off valves being arranged in said structural unit.

8. The compressed air processing apparatus of claim 2, further comprising a lifting axle valve, said lifting axle valve being arranged in said common structural unit.

9. The compressed air processing apparatus of claim 2, further comprising a locking valve,
   said locking valve being designed and arranged to cooperate with air suspension bellows of a front axle of a motor vehicle,
   said locking valve being designed and arranged to act as a transverse throttle, and
   said locking valve being arranged in said common structural unit.

10. The compressed air processing apparatus of claim 2, further comprising a locking valve,
    said locking valve being designed and arranged to cooperate with air suspension bellows of a rear axle of a motor vehicle,
    said locking valve being designed and arranged to act as a transverse throttle, and
    said locking valve being arranged in said common structural unit.

11. The compressed air processing apparatus of claim 2, further comprising a plurality of pressure sensors, said pressure sensors being designed and arranged to determine the pressure in air suspension bellows of a motor vehicle and to transmit respective signals to said electronic control unit, and said pressure sensors being arranged in said common structural unit.

12. The compressed air processing apparatus of claim 1, further comprising a common structural unit, said common structural unit being designed as a first module, said first module containing at least some of the components of said compressed air processing apparatus.

13. The compressed air processing apparatus of claim 12, wherein said first module is designed to be connectable to a second module, the second module containing pneumatically switchable valves of an air suspension system of a motor vehicle and pre-control valves.

14. The compressed air processing apparatus of claim 1, further comprising:
    a first module, said air dryer, said pressure controller and a regeneration valve being arranged in said first module;
    a second module, said multi-circuit protection valve being arranged in said second module;
    a third module, said electronic control unit and electrically controllable pre-control valves being arranged in said third module;
    a fourth module, pneumatically controllable valves of an air suspension system of a motor vehicle being arranged in said fourth module; and a fifth module, electrically controllable pre-control valves being arranged in said fifth module.

15. A compressed air processing apparatus for motor vehicles including a compressed air processing system and an air suspension system, said apparatus built as a structural unit and comprising:
a pressure controller;
an air dryer;
a multi-circuit protection valve comprising a plurality of valves designed and arranged for the supply of at least two circuits wherein at least one circuit is associated with the supply of an operational brake;
a switching valve, said switching valve being designed and arranged to supply compressed air to the air suspension system including at least one valve and to deaerate the air suspension system; and
an electronic control unit, said electronic control unit being designed and arranged to control said pressure controller, said air dryer and said multi-circuit protection valve, said electronic control unit being designed and arranged to control the at least one valve of the air suspension system.

16. The compressed air processing apparatus of claim 15, wherein the air suspension system includes a plurality of locking valves, a plurality of air suspension bellows and a plurality of conduits being connected to the air suspension bellows, said compressed air processing apparatus further comprising a structural unit in which said pressure controller, said air dryer, said multi-circuit protection valve, said switching valve and the locking valves are arranged.

17. The compressed air processing apparatus of claim 15, further comprising:
a solenoid valve, said solenoid valve being designed and arranged as a pre-control valve for the switching valve, the switching valve being designed as a pneumatically switchable valve; and
an additional valve, said additional valve being designed and arranged to be pneumatically switchable,
said solenoid valve being designed and arranged to also control said additional valve.

18. The compressed air processing apparatus of claim 17, wherein said additional valve is designed as an overflow valve of said multi-circuit protection valve.

19. The compressed air processing apparatus of claim 15, further comprising an additional valve, said additional valve being designed to be pneumatically switchable, said switching valve being designed to be electrically directly switchable, said switching valve being designed and arranged to control said additional valve.

20. A system for processing compressed air and for supplying air suspension to a motor vehicle, comprising:
an air suspension system, said air suspension system including a switching valve, said switching valve being designed and arranged to supply compressed air to said air suspension system and to deaerate said air suspension system; and
a compressed air processing apparatus built as a structural unit, said compressed air processing apparatus including:
a pressure controller;
an air dryer;
a multi-circuit protection valve comprising a plurality of valves designed and arranged for the supply of at least two circuits wherein at least one circuit is associated with the supply of an operational brake; and
an electronic control unit, said electronic control unit being designed and arranged to control said pressure controller, said air dryer and said multi-circuit protection valve, said electronic control unit being designed and arranged to control said switching valve of said air suspension system.

21. The system of claim 20, further comprising:
a plurality of locking valves;
a plurality of air suspension bellows;
a plurality of conduits, said conduits being connected to said air suspension bellows; and
a structural unit, said pressure controller, said air dryer, said multi-circuit protection valve, said switching valve, said locking valves and said conduits being arranged in said structural unit.

22. The system of claim 20, further comprising:
a solenoid valve, said solenoid valve being designed and arranged as a pre-control valve for said switching valve, said switching valve being designed as a pneumatically switchable valve; and
an additional valve, said additional valve being designed and arranged to be pneumatically switchable,
said solenoid valve being designed and arranged to also control said additional valve.

23. The system of claim 22, wherein said additional valve is designed as an overflow valve of said multi-circuit protection valve.

24. The system of claim 20, further comprising an additional valve, said additional valve being designed to be pneumatically switchable, said switching valve being designed to be electrically directly switchable, said switching valve being designed and arranged to control said additional valve.

25. The system of claim 24, wherein said additional valve is designed as an overflow valve of said multi-circuit protection valve.

* * * * *